United States Patent
Peng et al.

(10) Patent No.: US 11,025,910 B2
(45) Date of Patent: Jun. 1, 2021

(54) VIDEO ENCODER, VIDEO DECODER, AND VIDEO SYSTEM

(71) Applicant: Novatek Microelectronics Corp., Hsinchu (TW)

(72) Inventors: Ting Peng, Xi'an (CN); Xin Huang, Xi'an (CN)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/576,748

(22) Filed: Sep. 19, 2019

(65) Prior Publication Data

US 2021/0067773 A1 Mar. 4, 2021

(30) Foreign Application Priority Data

Sep. 3, 2019 (CN) .......................... 201910826818.1

(51) Int. Cl.
*H04N 19/117* (2014.01)
*H04N 19/14* (2014.01)
*H04N 19/176* (2014.01)
*H04N 19/46* (2014.01)
*H04N 19/70* (2014.01)

(52) U.S. Cl.
CPC ........... *H04N 19/117* (2014.11); *H04N 19/14* (2014.11); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 2008/0080619 | A1* | 4/2008 | Heng | H04N 19/86 375/240.18 |
| 2008/0137752 | A1* | 6/2008 | He | H04N 19/137 375/240.24 |
| 2009/0304086 | A1* | 12/2009 | Shi | H04N 19/156 375/240.24 |
| 2013/0272425 | A1* | 10/2013 | Van Der Auwera | H04N 19/80 375/240.24 |
| 2015/0350687 | A1* | 12/2015 | Zhai | H04N 19/186 375/240.25 |
| 2018/0352264 | A1* | 12/2018 | Guo | H04N 19/176 |
| 2019/0373258 | A1* | 12/2019 | Karczewicz | H04N 19/174 |

* cited by examiner

*Primary Examiner* — Frederick D Bailey
(74) *Attorney, Agent, or Firm* — JCIPRNET

(57) ABSTRACT

A video encoder, a video decoder and a video system are provided. The video encoder performs a video encoding operation on a first video frame stream to generate an encoded stream to the video decoder, wherein the encoded stream contains deblocking filtering information. The video decoder performs a video decoding operation on the encoded stream to generate a second video frame stream. The video decoder determines whether to forcibly perform a deblocking filtering operation on a current block of a current frame of the second video frame stream according to the deblocking filtering information.

37 Claims, 3 Drawing Sheets

VIDEO ENCODER, VIDEO DECODER, AND VIDEO SYSTEM

CROSS-REFERENCE TO RELATED APPLICATION

This application claims the priority benefit of China application serial no. 201910826818.1, filed on Sep. 3, 2019. The entirety of the above-mentioned patent application is hereby incorporated by reference herein and made a part of this specification.

BACKGROUND

Field of the Invention

The invention relates to a video apparatus and more particularly to a video encoder, a video decoder and a video system.

Description of Related Art

Generally, a video encoder encodes an image frame with a block as a unit, so as to generate an encoded stream. A video decoder may perform a video decoding operation (i.e., image reconstitution) on the encoded stream to generate a decoded stream. During the image reconstitution, a phenomenon of discontinuity may occur to an edges between two adjacent blocks, such phenomenon is referred to as a blocking effect, and the visual discontinuity of the edge of the blocks is referred to as a blocking artifact. The video decoder may perform a deblocking filtering operation on the decoded stream to generate a video frame stream. The deblocking filtering operation may reduce visual flaws on a boundary between the blocks.

A conventional video decoder may calculate a texture degree of an edge of a certain block in the image frame according to the decoded stream (the reconstituted image) and then, determine whether to perform the deblocking filtering operation on this block according to the texture degree. The conventional video decoder may perform the deblocking filtering operation on a region with simple textures (e.g., a planar region, i.e., a block with a smaller texture degree) in the image frame to reduce the visual flaws generated to the boundary between the blocks. For a region with plentiful textures (e.g., a grassland, forest, etc., i.e., a block with a greater texture degree), the conventional video decoder does not perform the deblocking filtering operation.

However, in some situations (e.g., in the encoding performed with a low code rate), the conventional video decoder has unideal deblocking performance on a region with irregular textures (the region with plentiful textures), this is because the conventional video decoder does not perform the deblocking filtering operation on the region with plentiful textures. Therefore, the deblocking performance has to be improved for the region with the irregular textures.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provide a video encoder, a video decoder and a video system for improving deblocking performance.

According to an embodiment of the invention, a video encoder is provided. The video encoder is capable of providing an encoded stream to a video decoder. The video encoder includes a video encoding circuit and a control circuit. The video encoding circuit is configured to perform a video encoding operation on a video frame stream to generate the encoded stream. The control circuit is coupled to the video encoding circuit to control the video encoding operation. The control circuit adds deblocking filtering information into the encoded stream.

According to an embodiment of the invention, a video decoder is provided. The video decoder includes a video decoding circuit and a deblocking filter circuit. The video decoding circuit is configured to perform a video decoding operation on an encoded stream to generate a decoded stream, wherein the encoded stream contains deblocking filtering information. The deblocking filtering circuit is coupled to the video decoding circuit to receive the decoded stream. The deblocking filtering circuit is configured to perform a deblocking filtering operation on the decoded stream to generate a video frame stream. The deblocking filtering circuit is configured to determine whether to forcibly perform the deblocking filtering operation on a current block of a current frame according to the deblocking filtering information.

According to an embodiment of the invention, a video system is provided. The video system includes a video encoder and a video decoder. The video encoder is configured to perform a video encoding operation on a first video frame stream to generate an encoded stream, wherein the encoded stream contains deblocking filtering information. The video decoder is configured to perform a video decoding operation and a deblocking filtering operation on the encoded block stream to generate a second video frame stream. The video decoder determines whether to forcibly perform the deblocking filtering operation on a current block of a current frame of the second video frame stream according to the deblocking filtering information.

To sum up, the video encoder provided by the embodiments of the invention can provide the deblocking filtering information to the video decoder. The video decoder can determine whether to forcibly perform the deblocking filtering operation on the current block of the current frame according to the deblocking filtering information. When it is determined to perform the deblocking filtering operation on the current block, the video decoder, without selection, can perform the deblocking filtering operation on the current block no matter what texture degree of the current block is. Therefore, the video system provided by the embodiments can improve the deblocking performance for the region with the irregular textures.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
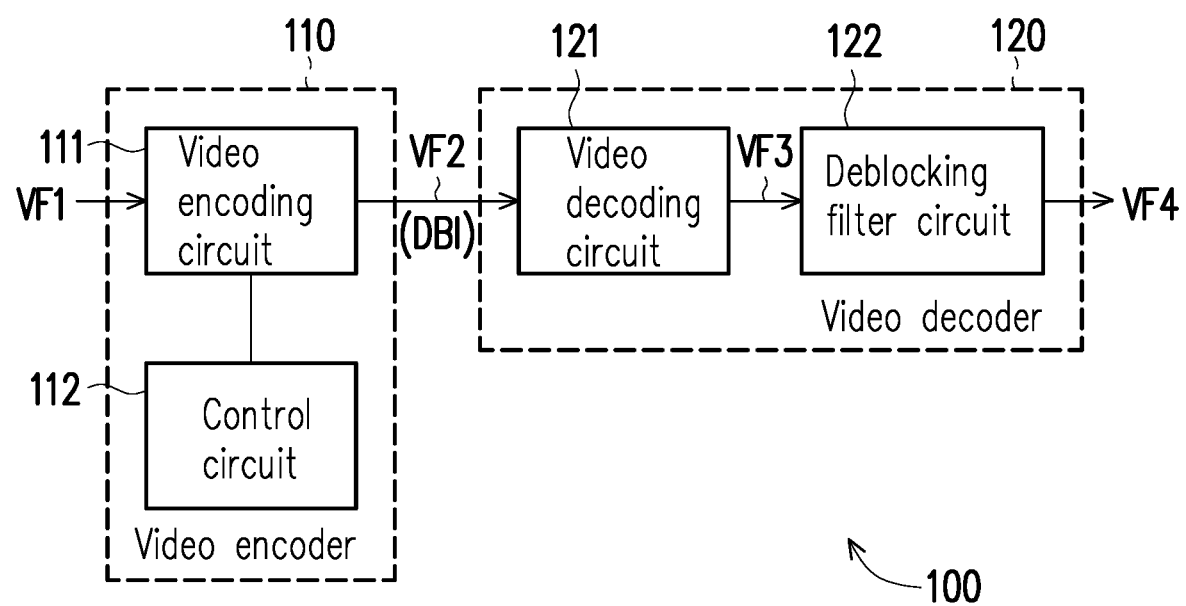
FIG. 1 is a schematic circuit block diagram illustrating a video system according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a video system 100 according to an embodiment of the invention. The video system 100 includes a video encoder 110 and a video decoder 120. The video encoder 110 may perform a video encoding operation on a video frame stream VF1 to generate an encoded stream VF2, wherein the encoded stream VF2 contains deblocking filtering information DBI. The encoding algorithm of the video encoding operation is not limited in the present embodiment. For example, in some embodiments, the video encoding operation may include high efficiency video coding (HEVC), H.265 or other video encoding techniques.

The video encoder 110 is capable of providing the encoded stream VF2 to the video decoder 120. In some application scenarios, the video encoder 110 may instantly transmit the encoded stream VF2 to the video decoder 120 through a communication channel (not shown, for example, a wireless communication channel). In some other application scenarios, the encoded stream VF2 generated by the video encoder 110 may be stored in a recording medium (not shown, for example, an optical disk, a network server, etc.). The video decoder 120 may, at any time, obtain the encoded stream VF2 from the recording medium.

Specific contents of the deblocking filtering information DBI may be determined based on a design requirement. For example, in some embodiments, the deblocking filtering information DBI includes information for the video decoder 120 to determine whether to forcibly perform the deblocking filtering operation on only a current block of a current frame according to the deblocking filtering information DBI. In some other embodiments, the deblocking filtering information DBI includes information for the video decoder 120 to determine whether to forcibly perform the deblocking filtering operation on all blocks (a plurality of blocks) of the current frame according to the deblocking filtering information DBI.

For example, the deblocking filtering information DBI may contain a plurality of flags. The flags correspond to different blocks of the current frame. For example, the flags include a current flag corresponding to the current block of the current frame. The video encoder 110 provides the current flag to the video decoder 120, such that the video decoder 120 may determine whether to forcibly perform the deblocking filtering operation on the current block according to the current flag. Based on a design requirement, the flags may be embeded in a data structure of the encoded stream VF2, or the flags may be configured outside the encoded stream VF2 (but transmitted together with the encoded stream VF2 to the video decoder 120). For example, in some embodiments, the encoded stream VF2 includes a header of the current frame, and the flags corresponding to the current frame are recorded in the header of the current frame of the encoded stream VF2.

In some other embodiments, the deblocking filtering information DBI is recorded in a stream syntax of the encoded stream VF2. Generally, the stream syntax is configured at a start point of the encoded stream VF2. The stream syntax is well-known to the public and will not be repeatedly described. The deblocking filtering information DBI recorded in the stream syntax of the encoded stream VF2 is provided to the video decoder 120. The video decoder 120 may determine whether to forcibly perform the deblocking filtering operation on all the blocks of the current frame according to the deblocking filtering information DBI.

The video decoder 120 may perform a video decoding operation and the deblocking filtering operation on the encoded block stream VF2 to generate a video frame stream VF4. The decoding algorithm of the video decoding operation is not limited in the present embodiment. For example, in some embodiments, the video encoding operation may include a decoding operation complying with the HEVC standard or other video decoding techniques. The video decoder 120 may determine whether to forcibly perform the deblocking filtering operation on the current block of the current frame of the video frame stream VF4 according to the deblocking filtering information DBI. When it is determined to perform the deblocking filtering operation on the current block, the video decoder 120, without selection, may perform the deblocking filtering operation on the current block no matter what texture degree of the current block is.

When it is determined not to perform the deblocking filtering operation on the current block, the video decoder 120 may selectively perform the deblocking filtering operation on the current block according to a texture degree of the current block. For example, when the texture degree of the current block is lower than a certain threshold, the video decoder 120 may perform the deblocking filtering operation on the current block, and when the texture degree of the current block is greater than this threshold, the video decoder 120 does not perform the deblocking filtering operation on the current block.

In the embodiment illustrated in FIG. 1, the video encoder 110 includes a video encoding circuit 111 and a control circuit 112. The video encoder 111 may perform the video encoding operation on the video frame stream VF1 to generate the encoded stream VF2. The control circuit 112 is coupled to the video encoding circuit 111 to control the video encoding operation. The encoding algorithm of the video encoding operation is not limited in the present embodiment. For example, in some embodiments, the video encoding operation may include an encoding operation complying with the HEVC standard or other video decoding techniques. In some embodiments, the video encoding operation of the video encoding circuit 111 may include HEVC, H.265 or other video encoding techniques. The video encoding circuit 111 will generate a reconstructed frame according to the encoded stream VF2. The video encoding circuit 111 also performs deblocking process by a deblocking unit (not shown) in the video encoding circuit 111. The deblocking unit (not shown) in the video encoding circuit 111 processing on the reconstructed frame to generate a deblocked frame for referred to a next frame of the video frame stream VF1. This deblocking process of the video encoding circuit 111 is the same as the deblocking process of the video decoding circuit 121.

Before the video encoding operation (or during the process of the video encoding operation), the control circuit 112 may calculate the texture degree of the current block of the current frame in the video frame VF1. The calculation details related to the texture degree are not limited in the present embodiment. Based on a design requirement, in some embodiments, the calculation of the texture degree may include a conventional texture algorithm or other calculation manners.

After the control circuit 112 calculates the texture degree of the current block of the current frame, the control circuit 112 may determine the deblocking filtering information DBI of the current block according to the texture degree. The control circuit 112 may add the deblocking filtering information DBI into the encoded stream VF2, so as to transmit the deblocking filtering information DBI the video decoder 120. After the deblocking filtering information DBI is provided to the video decoder 120, the video decoder 120 may determine whether to forcibly perform the deblocking filtering operation on the current block of the current frame according to the deblocking filtering information DBI. For example, when the current block of the current frame has irregular textures (for example, the texture degree is greater than the threshold), the control circuit 112 may provide the deblocking filtering information DBI to the video decoder 120 to force the video decoder 120 to perform the deblocking filtering operation on the current block of the current frame.

Figure 2:
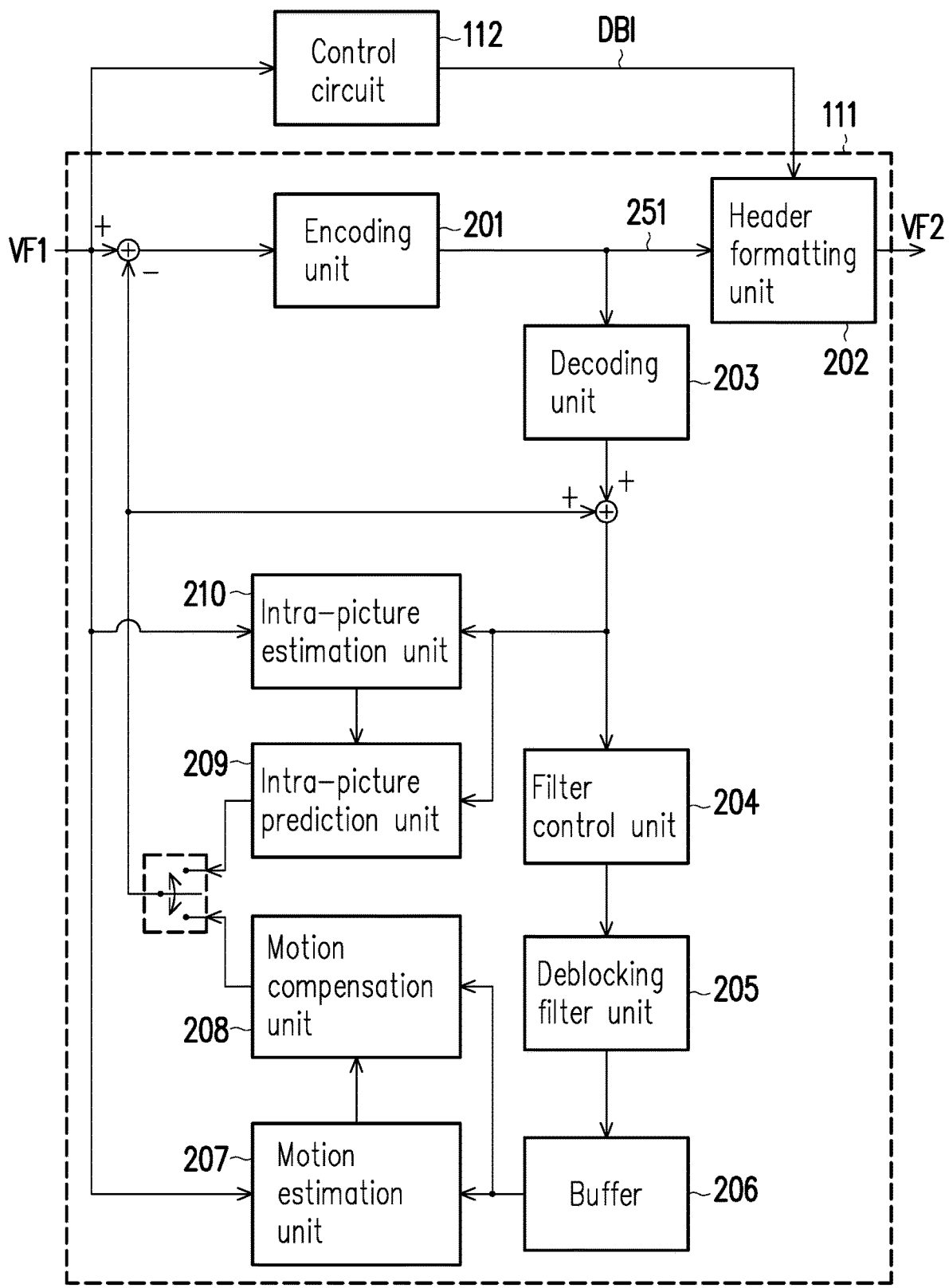
FIG. 2 is a schematic circuit block diagram illustrating a video encoding circuit according to an embodiment of the invention.

FIG. 2 is a schematic circuit block diagram illustrating the video encoding circuit 111 of FIG. 1 according to an embodiment of the invention. In the embodiment illustrated in FIG. 2, the video encoding circuit 111 includes an encoding unit 201, a header formatting unit 202, a decoding unit 203, a filter control unit 204, a deblocking unit 205, a buffer 206, a motion estimation unit 207, a motion compensation unit 208, an intra-picture prediction unit 209 and an intra-picture estimation unit 210. Based on different design demands, the blocks of the encoding unit 201, the header formatting unit 202, the decoding unit 203, the filter control unit 204, the deblocking unit 205, the buffer 206, the motion estimation unit 207, the motion compensation unit 208, the intra-picture prediction unit 209 and/or the intra-picture estimation unit 210 may be implemented in a form of hardware (i.e., circuits), firmware, software (i.e., programs) or in a combination of many of the aforementioned three forms.

The encoding unit 201 performs the transform operation, the scaling operation and the quantization operation, and generates an encoded frame 251 to the header formatting unit 202. The transform operation, the scaling operation and the quantization operation are well-known to the public and will not be repeatedly described. The header formatting unit 202 generates the header of the encoded frame 251, and generates the encoded stream VF2 according to the header and the encoded frame 251. The control circuit 112 outputs the deblocking filtering information DBI to the header formatting unit 202 for adding the deblocking filtering information DBI into the encoded stream VF2.

The decoding unit 203 performs the inverse transform operation, the scaling operation and the inverse quantization operation, and generates a reconstructed frame according to the encoded frame 251. The inverse transform operation, the scaling operation and the inverse quantization operation are well-known to the public and will not be repeatedly described.

The filter control unit 204 may perform the filter switch decision-making algorithm on the current block of the reconstructed frame, so as to control the deblocking unit 205 to selectively perform the deblocking filtering operation on the current block. The deblocking unit 205 performs the deblocking process on the reconstructed frame to generate a deblocked frame for referred to a next frame of the video frame stream VF1. This deblocking process of the deblocking unit 205 is the same as the deblocking process of the video decoding circuit 121. The deblocking unit 205 outputs the deblocked frame into the buffer 206.

In the embodiment illustrated in FIG. 1, the video decoder 120 includes a video decoding circuit 121 and a deblocking filter circuit 122. The video decoding circuit 121 may perform the video decoding operation on the encoded stream VF2 to generate a decoded stream VF3. The decoding algorithm of the video decoding operation is not limited in the present embodiment. For example, in some embodiments, the video decoding operation of the video decoding circuit 121 may include a decoding operation complying with the HEVC standard, H.265 standard or other video decoding techniques.

The deblocking filtering circuit 122 is coupled to the video decoding circuit 121 to receive the decoded stream VF3. The deblocking filtering circuit 122 may perform the deblocking filtering operation on the decoded stream VF3 to generate the video frame stream VF4. As described above, the encoded stream VF2 contains the deblocking filtering information DBI. Thus, the control circuit 121 may further transmit the deblocking filtering information DBI to the video decoder 122. The deblocking filtering circuit 122 may determine whether to forcibly perform the deblocking filtering operation on the current block of the current frame according to the deblocking filtering information DBI. For example, when the deblocking filtering information DBI contains a first logic state, the deblocking filtering circuit 122 may perform the deblocking filtering operation on the current block corresponding to the current flag, and when the deblocking filtering information DBI contains a second logic state, the deblocking filtering circuit 122 may perform a filter switch decision-making algorithm on the current block corresponding to the current flag, so as to determine whether to perform the deblocking filtering operation on the current block.

For example, the control circuit 122 (or other circuits) may calculate a texture degree of the current block of the current frame in the decoded stream VF3. When it is determined not to perform the deblocking filtering operation on the current block, the deblocking filter circuit 122 may perform the filter switch decision-making algorithm on the current block, so as to selectively perform the deblocking filtering operation on the current block according to the texture degree of the current block. For example, when a result of the filter switch decision-making algorithm indicates that the texture degree of the boundary of the current block is lower than a certain threshold (wherein this threshold is determined based on a design requirement), the deblocking filtering circuit 122 may perform the deblocking filtering operation on the current block, and when the texture degree of the current block is greater than this threshold, the deblocking filtering circuit 122 does not perform the deblocking filtering operation on the current block. The detailed algorithm of the deblocking filtering operation is not limited in the present embodiment. Based on a design requirement, the deblocking filtering operation may include a conventional deblocking filtering algorithm or other deblocking operations.

When it is determined to perform the deblocking filtering operation on the current block, the video decoder 122, without selection, may perform the deblocking filtering operation on the current block no matter what texture degree of the current block is. For example, when it is determined to perform the deblocking filtering operation on the current block, no matter what original texture degree of the current block is, the deblocking filtering circuit 122 (or other circuits) may forcibly set the texture degree of the current block to a fixed value (e.g., 0) lower than the threshold according to the deblocking filtering information DBI, such that the deblocking filtering circuit 122 has to perform the deblocking filtering operation on the current block.

The video encoder 120 further includes encoding mode information. The encoding mode information may indicate an encoding mode in the encoded stream VF2. The encoding mode information may be provided to the video decoder 120, such that the video decoder 120 may determine whether the current block of the current frame is an edge of a unit block. The unit block may be set based on a design requirement. For example, the unit block may be a transform unit (TU) block. A size of the unit block may be 32*32, 16*16, 8*8 or other sizes. The deblocking filtering information DBI and the encoding mode information may be both provided to the video decoder 120, such that the video decoder 120 may determine whether to forcibly perform the deblocking filtering operation on the current block of the current frame according to both the deblocking filtering information DBI and the encoding mode information.

Figure 3:
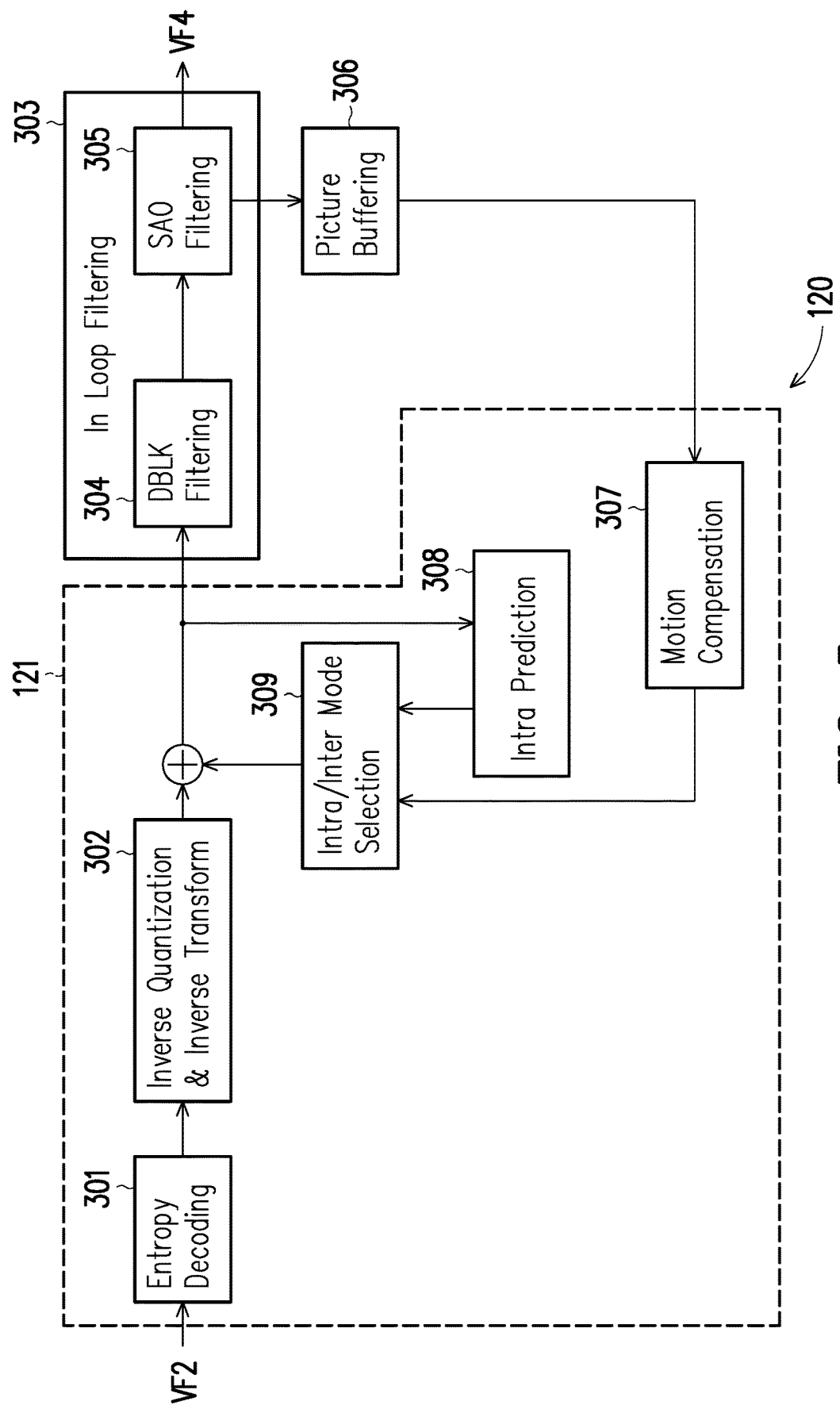
FIG. 3 is a schematic circuit block diagram illustrating the video decoder of FIG. 1 according to another embodiment of the invention.

FIG. 3 is a schematic circuit block diagram illustrating the video decoder 120 of FIG. 1 according to another embodiment of the invention. In the embodiment illustrated in FIG. 3, the video decoder 120 includes the video decoding circuit 121, an in-loop filtering unit 303 and a picture buffering unit 306. The video decoding circuit 121 may comply with HEVC or H.265 standard. The video decoding circuit 121 generates a reconstructed frame according to the encoded stream VF2. The in-loop filtering unit 303, for example, includes a deblocking filtering unit (which may be implemented as a deblocking filtering circuit) 304 and a sample adaptive offset (SAO) filtering unit 305. The deblocking filtering unit (which may be implemented as a deblocking filtering circuit) 304 performs a deblocking process on the reconstructed frame to generate a deblocked frame.

The video decoding circuit 121 can be implemented according to design demands. For example, the video decoding circuit 121 includes at least one of an entropy decoding unit 301, an inverse quantization and inverse transform unit 302, a motion compensation unit 307, an intra prediction unit 308 and an intra/inter mode selection unit 309. The entropy decoding unit 301 performs entropy decoding on the encoded stream VF2, and generates information such as VPS, SPS, PPS, slice header, and detailed coding syntax element information of each frame. The inverse quantization and inverse transform unit 302 performs inverse quantization and inverse transform according to the output of the entropy decoding unit 301, so as to generate an inverse transformed residual value. The inverse transformed residual value can be summed with the predicted pixel value provided by the intra/inter mode selection unit 309 to obtain a reconstructed pixel (reconstructed frame).

The deblocking filtering unit 304 can selectively perform the deblocking filtering operation on the current block of the reconstructed frame according to the semantic information in the PPS and the slice header to generate a deblocked frame. The deblocking process performed by the deblocking filtering unit 304 corresponds to the deblocking process of the deblocking unit 205 of the video encoding circuit 111. Operations of the deblocking filtering unit 304 may be inferred with reference to the description related to the deblocking filtering circuit 122 and thus, will not be repeated. The SAO filtering unit 305 performs the SAO filtering operation on the deblocked frame to generate the video frame stream VF4. The SAO filtering unit 305 outputs the video frame stream VF4 into the picture buffering unit 306.

Based on different design demands, the blocks of the video encoding circuit 111, the control circuit 112, the video decoding circuit 121 and/or the deblocking filter circuit 122 may be implemented in a form of hardware, firmware, software (i.e., programs) or in a combination of many of the aforementioned three forms.

In terms of the hardware form, the blocks of the video encoding circuit 111, the control circuit 112, the video decoding circuit 121 and/or the deblocking filter circuit 122 may be implemented in a logic circuit on an integrated circuit. Related functions of the video encoding circuit 111, the control circuit 112, the video decoding circuit 121 and/or the deblocking filter circuit 122 may be implemented in the form of hardware by utilizing hardware description languages (e.g., Verilog HDL or VHDL) or other suitable programming languages. For example, the related functions of the video encoding circuit 111, the control circuit 112, the video decoding circuit 121 and/or the deblocking filter circuit 122 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the video encoding circuit 111, the control circuit 112, the video decoding circuit 121 and/or the deblocking filter circuit 122 may be implemented as programming codes. For example, the video encoding circuit 111, the control circuit 112, the video decoding circuit 121 and/or the deblocking filter circuit 122 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). Additionally, the programming codes may be accessed from the recording medium and executed by a computer, a central processing unit (CPU), a controller, a micro-controller or a microprocessor to accomplish the related functions. As for the recording medium, a non-transitory computer readable medium, such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, the video encoder provided by the embodiments of the invention can provide the deblocking filtering information to the video decoder. The video decoder can determine whether to forcibly perform the deblocking filtering operation on the current block of the current frame according to the deblocking filtering information. When it is determined to perform the deblocking filtering operation on the current block, the video decoder, without selection, can perform the deblocking filtering operation on the current block no matter what texture degree of the current block is. Therefore, the video system provided by the embodiments can improve the deblocking performance for the region with irregular textures.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A video encoder, capable of providing an encoded stream to a video decoder, comprising:
   a video encoding circuit, configured to perform a video encoding operation on a video frame stream to generate the encoded stream; and
   a control circuit, coupled to the video encoding circuit to control the video encoding operation, wherein the control circuit adds deblocking filtering information into the encoded stream to be provided to the video decoder,
   wherein when a current block of a current frame has irregular textures, the deblocking filtering information is provided to the video decoder for the video decoder to forcibly perform a deblocking filtering operation on the current block of the current frame, and
   when the video decoder determines not to forcibly perform the deblocking filtering operation on the current block, the video decoder selectively performs the deblocking filtering operation on the current block according to a texture degree of the current block.

2. The video encoder according to claim 1, wherein the deblocking filtering information is provided to the video decoder, such that the video decoder determines whether to forcibly perform the deblocking filtering operation on at least one current block of the current frame according to the deblocking filtering information.

3. The video encoder according to claim 2, wherein the video encoder further comprises encoding mode information, the encoding mode information indicates an encoding mode in the encoded stream, and the encoding mode information is provided to the video decoder, such that the video decoder determines whether the current block of the current frame is an edge of a unit block.

4. The video encoder according to claim 3, wherein the deblocking filtering information and the encoding mode information are both provided to the video decoder, such that the video decoder determines whether to forcibly perform the deblocking filtering operation on the at least one current block of the current frame according to both the deblocking filtering information and the encoding mode information.

5. The video encoder according to claim 2, wherein the deblocking filtering information comprises information for the video decoder to determine whether to forcibly perform the deblocking filtering operation on only a current block of the current frame according to the deblocking filtering information.

6. The video encoder according to claim 2, wherein the deblocking filtering information comprises information for the video decoder to determine whether to forcibly perform the deblocking filtering operation on all blocks of the current frame according to the deblocking filtering information.

7. The video encoder according to claim 1, wherein the control circuit calculates the texture degree for the current block of the current frame to determine the deblocking filtering information of the current block.

8. The video encoder according to claim 1, wherein the deblocking filtering information comprises a plurality of flags corresponding to different blocks of the current frame, wherein the flags comprise a current flag corresponding to the current block of the current frame.

9. The video encoder according to claim 8, wherein a flag for each block in the current frame is provided to the video decoder, such that the video decoder determines whether to forcibly perform the deblocking filtering operation on the current block according to flag information of each block in the current frame.

10. The video encoder according to claim 8, wherein the encoded stream comprises a header of the current frame, and the flag for each block in the current frame are recorded in the header of the current frame of the encoded stream.

11. The video encoder according to claim 1, wherein the deblocking filtering information is recorded in a stream syntax of the encoded stream.

12. The video encoder according to claim 11, wherein the deblocking filtering information recorded in the stream syntax of the encoded stream is provided to the video decoder, such that the video decoder determines whether to forcibly perform the deblocking filtering operation on all blocks of the current frame according to the deblocking filtering information.

13. The video encoder according to claim 1, wherein the video encoding operation of the video encoding circuit includes HEVC or H.265, the video encoding circuit generates a reconstructed frame according to the encoded stream, and the video encoding circuit performs deblocking process on the reconstructed frame to generate a deblocked frame for referred to a next frame of the video frame stream.

14. A video decoder capable of processing an encoded stream provided by a video encoder, wherein the encoded stream comprises deblocking filtering information provided by the encoder and the deblocking filtering information is added into the encoded stream to be provided to the video decoder, comprising:
    a video decoding circuit, configured to perform a video decoding operation on an encoded stream to generate a decoded stream; and
    a deblocking filtering circuit, coupled to the video decoding circuit to receive the decoded stream, and configured to perform a deblocking filtering operation on the decoded stream to generate a video frame stream,
    wherein the deblocking filtering circuit is configured to determine whether to forcibly perform the deblocking filtering operation on a current block of a current frame according to the deblocking filtering information,
    wherein when the current block of the current frame has irregular textures, the deblocking filtering information is provided to the video decoder for the video decoder to forcibly perform the deblocking filtering operation on the current block of the current frame, and when the video decoder determines not to forcibly perform the deblocking filtering operation on the current block, the video decoder selectively performs the deblocking filtering operation on the current block according to a texture degree of the current block.

15. The video decoder according to claim 14, wherein encoding mode information is provided to the video decoder, the encoding mode information indicates an encoding mode in the encoded stream, and the video decoder determines whether the current block of the current frame is an edge of a transform block according to the encoding mode information.

16. The video decoder according to claim 15, wherein the deblocking filtering information and the encoding mode information are both provided to the video decoder, and the video decoder determines whether to forcibly perform the deblocking filtering operation on the at least one current block of the current frame according to both the deblocking filtering information and the encoding mode information.

17. The video decoder according to claim 14, wherein the deblocking filtering information comprises information for the video decoder to determine whether to forcibly perform the deblocking filtering operation on only a current block of the current frame according to the deblocking filtering information.

18. The video decoder according to claim 14, wherein the deblocking filtering information comprises information for the video decoder to determine whether to forcibly perform the deblocking filtering operation on all blocks of the current frame according to the deblocking filtering information.

19. The video decoder according to claim 14, wherein the deblocking filtering information comprises a plurality of flags corresponding to different blocks of the current frame, wherein the flags comprise a current flag corresponding to the current block of the current frame.

20. The video decoder according to claim 19, wherein the deblocking filtering circuit determines whether to forcibly perform the deblocking filtering operation on the current block according the current flag corresponding to the current block of the current frame among the flags.

21. The video decoder according to claim 19, wherein the encoded stream comprises a header of the current frame, and the flags are recorded in the header of the current frame of the encoded stream.

22. The video decoder according to claim 14, wherein the deblocking filtering information is recorded in a stream syntax of the encoded stream.

23. The video decoder according to claim 14, wherein
when the deblocking filtering information contains a first logic state, the deblocking filtering circuit performs the deblocking filtering operation on the current block; and
when the deblocking filtering information contains a second logic state, the deblocking filtering circuit performs a filter switch decision-making algorithm on the current block to determine whether to perform the deblocking filtering operation on the current block.

24. The video decoder according to claim 23, wherein
when a result of the filter switch decision-making algorithm indicates that the texture degree of a boundary of the current block is greater than a threshold, the deblocking filtering circuit does not perform the deblocking filtering operation on the current block; and
when the result of the filter switch decision-making algorithm indicates that the texture degree of the boundary of the current block is lower than the threshold, the deblocking filtering circuit performs the deblocking filtering operation on the current block.

25. The video decoder according to claim 14, wherein the video decoding operation of the video decoding circuit includes HEVC or H.265.

26. The video decoder according to claim 14, wherein the video decoding circuit generates a reconstructed frame according to the encoded stream, and the deblocking filtering circuit performs deblocking process on the reconstructed frame to generate a deblocked frame for referred to a next frame of the encoded stream.

27. A video system, comprising:
a video encoder, configured to perform a video encoding operation on a first video frame stream to generate an encoded stream, wherein the encoded stream comprises deblocking filtering information; and
a video decoder, configured to perform a video decoding operation and a deblocking filtering operation on the encoded block stream to generate a second video frame stream, wherein the deblocking filtering information is added into the encoded stream to be provided to the video decoder,
wherein when the deblocking filtering information indicates that a current block of a current frame has irregular textures, the video decoder determines to forcibly perform the deblocking filtering operation on the current block of the current frame of the second video frame stream according to the deblocking filtering information, and
when the video decoder determines not to forcibly perform the deblocking filtering operation on the current block, the video decoder selectively performs the deblocking filtering operation on the current block according to a texture degree of the current block.

28. The video system according to claim 27, wherein the video encoder calculates the texture degree for the current block of the current frame of the first video frame stream to determine the deblocking filtering information of the current block.

29. The video system according to claim 27, wherein the video encoding operation of the video encoder includes HEVC or H.265, the video encoder generates a reconstructed frame according to the encoded stream, and the video encoder performs deblocking process on the reconstructed frame to generate a deblocked frame for referred to a next frame of the video frame stream, and the deblocking process of the video encoder is the same as deblocking process of the video decoder.

30. The video system according to claim 27, wherein the deblocking filtering information comprises a plurality of flags corresponding to different blocks of the current frame, wherein the flags comprise a current flag corresponding to the current block of the current frame.

31. The video system according to claim 30, wherein the video decoder determines whether to forcibly perform the deblocking filtering operation on the current block according to the current flag.

32. The video system according to claim 30, wherein the encoded stream comprises a header of the current frame, and the flags are recorded in the header of the current frame of the encoded stream.

33. The video system according to claim 27, wherein the deblocking filtering information is recorded in a stream syntax of the encoded stream.

34. The video system according to claim 27, wherein
when the deblocking filtering information contains a first logic state, the video decoder performs the deblocking filtering operation on the current block; and when the deblocking filtering information contains a second logic state, the video decoder performs a filter switch decision-making algorithm on the current block to determine whether to perform the deblocking filtering operation on the current block.

35. The video system according to claim 34, wherein when a result of the filter switch decision-making algorithm indicates that the texture degree of a boundary of the current block is greater than a threshold, the video decoder does not perform the deblocking filtering operation on the current block; and when the result of the filter switch decision-making algorithm indicates that the texture degree of the boundary of the current block is lower than the threshold, the video decoder performs the deblocking filtering operation on the current block.

36. The video system according to claim 27, wherein the video decoding operation of the video decoder includes HEVC or H.265.

37. The video system according to claim 27, wherein the video decoder generates a reconstructed frame according to the encoded stream, and the video decoder performs deblocking process on the reconstructed frame to generate a deblocked frame for referred to a next frame of the encoded stream.

* * * * *